United States Patent

[11] 3,616,210

| [72] | Inventors | Katsunobu Tanaka;<br>Kazuo Kimura; Masaki Yamamoto, all of<br>Machida-shi, Japan |
|---|---|---|
| [21] | Appl. No. | 725,518 |
| [22] | Filed | Apr. 30, 1968 |
| [45] | Patented | Oct. 26, 1971 |
| [73] | Assignee | Kyowa Hakko Kogyo Co., Ltd.<br>Tokyo, Japan |
| [32] | Priority | May 15, 1967 |
| [33] | | Japan |
| [31] | | 42/30401 |

[54] PROCESS FOR PRODUCING L-GLUTAMIC ACID
10 Claims, No Drawings

| [52] | U.S. Cl. | 195/28 |
|---|---|---|
| [51] | Int. Cl. | C12b 1/00 |
| [50] | Field of Search | 195/28, 47, 30 |

[56] References Cited

UNITED STATES PATENTS

| 3,201,323 | 8/1965 | Douros et al. | 195/28 X |
| 3,224,946 | 12/1965 | Raymond | 195/28 X |
| 3,511,752 | 5/1970 | Tanaka et al. | 195/28 |

FOREIGN PATENTS

| 1,447,541 | 6/1966 | France | 195/28 |

OTHER REFERENCES

Iguchi et al., Glutamic Acid Formation from Hydrocarbons Chemical Abstract, Vol. 64, No. 11589, 1966

*Primary Examiner*—A. Louis Monacell
*Assistant Examiner*—Gary M. Nath
*Attorney*—Craig, Antonelli, Stewart and Hill

ABSTRACT: The present disclosure is directed to a process for producing amino acids such as L-glutamic acid which comprises culturing a gaseous hydrocarbon-assimilating micro-organism capable of producing said amino acid in an aqueous nutrient medium under aerobic conditions and in the presence of gaseous hydrocarbons as the main carbon source and a fermentation enhancer.

PROCESS FOR PRODUCING L-GLUTAMIC ACID

The present invention relates to a fermentation process for the production of L-glutamic acid. More particularly, the present invention is directed to an aerobic fermentation process for the production of said amino acid wherein gaseous hydrocarbons are used as the main carbon source.

One of the objects of the present invention is to provide an improved process for producing amino acids such as L-glutamic acid in a fermentation medium.

Another object of the present invention is to provide a process for producing L-glutamic acid by fermentation in the presence of gaseous hydrocarbons as the main carbon source which may be carried out in an efficacious and simple manner.

A further object of the present invention is to provide an improved fermentation process for the production of L-glutamic acid wherein a fermentation enhancer is added to the fermentation medium.

A still further object of the present invention is to provide a fermentation process which is inexpensive relative to known processes and effective in producing a high yield of product.

Other objects and further scope of applicability of the present invention will become apparent from the detailed description given hereinafter; it should be understood, however, that the detailed description and specific examples, while indicating preferred embodiments of the invention are given by way of illustration only, since various changes and modification within the spirit and scope of the invention will become apparent to those skilled in the art from this detailed description.

Today's fermentation industry places a great deal of importance upon the substitution of raw materials and especially the utilization of various hydrocarbons as an economic source of carbon. The present invention is directed to the utilization of gaseous hydrocarbons, for example butane, in the fermentation medium as the main carbon source, said hydrocarbons being available in bulk supply and at low cost. As a result of many investigations and experimentation, it has been found that some of the micro-organisms capable of assimilating liquid hydrocarbons also grow utilizing gaseous hydrocarbons. Furthermore, it has been found that the utilization of gaseous hydrocarbons is made even more effective when the cultivation with said micro-organisms is conducted in the presence of fermentation enhancers, for example, organic acids such as acetic acid, propionic acid, butyric acid, malonic acid, succinic acid, etc.; carbonates, such as sodium bicarbonate, calcium carbonate, etc.; sugars such as fructose, molasses, etc.; and sugar alcohols, such as sorbitol and the like. Thus it has been found that various amino acids, particularly L-glutamic acid, can be produced by fermentation utilizing gaseous hydrocarbon-assimilating micro-organisms together with gaseous hydrocarbons as the main carbon source instead of sugar materials or liquid hydrocarbons as conventionally used, and in the presence of the above-named substances as fermentation enhancers.

With respect to the microbial utilization of gaseous hydrocarbons, Foster et al. have reported in their studies on methane-utilizing organisms and on the production of microbial protein substances from methane. However, the present invention has found that such useful substances as amino acids can be produced in considerably larger amounts by fermentation utilizing gaseous hydrocarbon as the main carbon source.

The fermentation method according to the present invention has the following advantages when compared with conventional methods using sugar materials as the main carbon source or when compared with liquid hydrocarbons which have been recently used:

1. The gaseous hydrocarbons are abundant and inexpensive,
2. The storage, transportation and introduction of the gaseous hydrocarbons into the culture medium are relatively simple,
3. The recovery of the residual gaseous hydrocarbons from the fermentation medium can be readily effected,
4. The control and management of the concentration of the gaseous hydrocarbon source during fermentation is readily accomplished and
5. The fermentation liquor after completion of the fermentation is clear, thus facilitating isolation and purification thereof from the residual hydrocarbon.

In fermentations using gaseous hydrocarbons as the main carbon source, it is also possible to directly apply various fermentation procedures normally employed in conventional fermentations using liquid or gaseous hydrocarbons. However, in order to effectively increase the proportions of gaseous hydrocarbons dissolved in the fermentation medium, small amounts of nonutilizable liquid hydrocarbons or substances similar in effect thereto and/or antibiotics oils, surface active agents, and the like, are added to the fermentation medium, whereby the fermentation can be substantially enhanced.

The fermentation-enhancing substances which can be added to the fermentation medium according to the present invention include organic acids, or the salts thereof such as for example, acetic acid, propionic acid, n-butyric acid, isobutyric acid, valeric acid, isovaleric acid, malonic acid, succinic acid, glutaric acid, and the like, carbonates, such as for example sodium bicarbonate calcium carbonate and the like, sugars, such as for example fructose, glucose, maltose, sucrose, mannose, molasses, and the like, and sugar alcohols, such as for example sorbitol, dulcitol, mannitol glycerol, inositol, and the like. The optimum concentration of these additives in the fermentation medium varies depending upon which additive is used and the particular micro-organism employed. Generally, the above-mentioned additives are present in the fermentation in an amount of about 0.01 to 5 percent by weight. The addition of the fermentation-enhancing substances may be effected at the start of the fermentation, during fermentation or intermittently throughout the fermentation. As mentioned above, substances including liquid hydrocarbons and various oils can be added to the culture medium to enhance fermentation. Thus, for example, n-decene and/or sesame oil can be added to enchance fermentation. When such substances are added to the fermentation medium they are added in an amount equivalent to that of the fermentation enhancing substances mentioned above.

Examples of some of the micro-organisms which can be used in the process of the present invention include *Brevibacterium ketoglutamicum*, ATCC 15,587, *Brevibacterium kectoglutamicum*, ATCC 15,588, Arthrobacter roseoparaffinus, ATCC 15,584, and *Micrococcus paraffinolyticus*, ATCC 15,582.

As for the fermentation per se, either a synthetic culture medium or a natural nutrient medium is suitable as long as it contains the essential nutrients for the growth of the micro-organism strain employed. Such nutrients are well known in the art and include substances such as a carbon source, a nitrogen source, inorganic compounds and the like which are utilized by the micro-organism employed in appropriate amounts. A hydrocarbon gas such as ethane, propane, n-butane, iso-butane, and the like, as well as mixtures of these materials, are used in the fermentation process of the present invention as the main carbon source. The preferred hydrocarbon gas is butane. Small amounts of other carbon sources may also be present in the fermentation medium, such as for example liquid hydrocarbons including straight and branched-chain paraffins (alkanes) having from 5 to 24 carbon atoms, such as n-pentane, n-octane, n-decane, etc., carbohydrates such as glucose, fructose, maltose, sucrose, starch, starch hydrolysates, molasses, etc., or any other suitable carbon source such as glycerol, mannitol, sorbitol, organic acids, glutamic acid, etc. These substances may be used either alone or in mixtures of two or more but in small amounts when compared to the primary source of carbon, that is the hydrocarbon gases mentioned above. As a nitrogen source, various kinds of inorganic or organic slats or compounds, such as urea, ammonia or ammonium slats such as ammonium chloride, ammonium sulfate, ammonium nitrate, ammonium phosphate, etc., or one or more than one amino acid mixed in combination, or natural substances containing nitrogen, such as cornsteep liquor, yeast extract, meat extract, peptone, fish meal, bouillon, NZ amine (trademark for a series of casein hydrolysates), casamino acid, fish solubles, rice bran extract, ribonucleic acid, etc., may be employed. Again these substances may be used either singly or in combinations of two or more. Inorganic compounds which may be added to the culture medium include magnesium sulfate, sodium phosphate, potassium dihydrogen phosphate, potassium monohydrogen phosphate, iron sulfate or other iron slats, manganese chloride, calcium chloride, etc.

As is conventional in the art, growth-promoting agents such as biotin, thiamine, cobalamin and the like or amino acids such as aspartic acid, threonine, and methionine maybe added to the medium.

The fermentation employed herein is conducted under aerobic conditions, such as aerobic shaking of the culture or with stirring of a submerged culture, at a temperature of about 20° to 50° C. and at a pH of about 4 to 9.

The following examples are given merely as illustrative of the present invention and are not to be considered as limiting. The percentages therein are by weight but gas concentration is volume percent.

EXAMPLE 1

20 ml. of the following culture medium is prepared in a 250 ml. Erlenmeyer flask:

| | |
|---|---|
| $NH_4NO_3$ | 2.0% |
| $Na_2HPO_4 \cdot 12H_2O$ | 0.05% |
| $KH_2PO_4$ | 0.05% |
| $MgSO_4 \cdot 7H_2O$ | 0.01% |
| $MnSO_4 \cdot 4H_2O$ | 0.001% |
| $FeSO_4 \cdot 7H_2O$ | 0.001% |
| $ZnSO_4 \cdot 7H_2O$ | 0.001% |
| $CaCl_2 \cdot 2H_2O$ | 0.001% |
| $CuSO_4 \cdot 5H_2O$ | 50 γ/l. |
| $H_3BO_3$ | 10 γ/l. |
| $Na_2MoO_4 \cdot 2H_2O$ | 10 γ/l. |
| Cornsteep liquor | 0.01% |
| Ammonium acetate | 0.1% |

The pH of this medium is 7.0.

*Brevibacterium ketoglutamicum*, ATCC 15,587, previously cultured with aerobic shaking in a bouillon medium is inoculated into the culture medium and said medium is subjected to shaking at a temperature of 30° C. on an incubating shaker equipped with a thermostat for the gaseous phase. Culturing is conducted by supplying a mixed gas of n-butane and air having a butane gas concentration in the gas mixture of about 50 percent to the culture medium. Unused butane gas can by recycled and fresh butane gas can be added to the culture medium such that the butane concentration in the culture medium is always about 50 percent After 7 days, 0.50 g./dl. of L-glutamic acid is produced in the medium.

The fermentation broth is then centrifuged to remove the cells, and the pH is adjusted to 2.0 with the addition of hydrochloric acid. The thus obtained acidic layer is treated with cation exchange resin, Amberlite IR1200(H type) to absorb L-glutamic acid and the amino acid is eluted with an ammonium hydroxide solution. After the removal of ammonia, the fraction is evaporated wherein 76 mg. of L-glutamic acid in pure crystal form is produced.

Table I below shows the advantages in adding the fermentation-enhancing substances to the fermentation medium in producing L-glutamic acid. The micro-organism used and the fermentation method employed in obtaining the results shown in table I are the same as used in example I above.

Table I

| Fermentation-enhancing substances | Amount of addition | L-glutamic acid produced after 90 hours |
|---|---|---|
| | (%) | (g./dl.) |
| Acetic acid | 0.05 | 0.40 |
| Propionic acid | 0.05 | 0.41 |
| Butyric acid | 0.05 | 0.41 |
| Malonic acid | 0.05 | 0.43 |
| Succinic acid | 0.05 | 0.41 |
| Sodium bicarbonate | 0.05 | 0.42 |
| Calcium carbonate | 0.1 | 0.45 |
| Fructose | 0.05 | 0.42 |
| Sorbitol | 0.05 | 0.40 |
| Molasses | 0.05 | 0.41 |
| Nonaddition (control) | — | 0.22 |

Table 2 shows the advantages of the addition of fermentation-enhancing substances such as n-decene or sesame oil to the fermentation medium in the production of L-glutamic acid. Here again, the micro-organism used and the fermentation method employed are the same as that described in example I above, with the exception that 0.01 percent of Nonion OT-221 is added to the medium and ammonium acetate is omitted.

EXAMPLE II

Table II

| Fermentation-enhancing substances | Amount of addition | L-glumatic acid produced after 96 hours |
|---|---|---|
| | (%) | (g./dl.) |
| n-decene | 2 | 0.50 |
| Sesame oil | 0.1 | 0.52 |
| Nonaddition (control) | — | 0.22 |

Cultivation of *Arthrobacter roseoparaffinus*, ATCC 15,584, is carried out in the fermentation medium similarly as in example I, with the exception that 0.05 percent butyric acid is used in place of ammonium acetate and the pH is adjusted to 7.0 with NaOH. After 24 hours of culturing, 50 units/ml. of penicillin-G is added and the cultivation is continued for 6 days. After this fermentation period 0.55 g./dl. of L-glutamic acid is produced in the medium.

On the other hand, when the fermentation medium does not contain butyric acid, only 0.20 g./dl. of L-glutamic acid is produced.

EXAMPLE III

Using the same fermentation medium as in example I with the exception that 0.05 percent sodium bicarbonate is used in place of the ammonium acetate, and following the same procedures and conditions as in example I, *Brevibacterium ketoglutamicum*, ATCC 15,588, is cultivated in the fermentation medium. After 7 days of cultivation 0.51 g./dl. of L-glutamic acid is produced.

Using the same fermentation medium but excluding the use of sodium bicarbonate, the production of L-glutamic acid is only 0.20 g./dl.

EXAMPLE IV

Using the same medium as in example I with the exception that 0.1 percent molasses is used instead of the ammonium acetate and following the same procedures and conditions as in example I, *Micrococcus paraffinolyticus*, ATCC 15,582 is inoculated into the culture medium. After 24 hours of culturing 50 units/ml. of penicillin-G is added and the cultivation is continued for an additional 6 days. At the end of this period of fermentation 0.33 g./dl. of L-glutamic acid is produced.

The invention being thus described, it will be obvious that the same may be varied in many ways. Such variations are not to be regarded as a departure from the spirit and scope of the invention, and all such modifications are intended to be included within the scope of the following claims.

It is claimed:

1. A process for producing L-glutamic acid which comprises culturing a gaseous hydrocarbon-assimilating micro-organism selected from the group consisting of *Brevibacterium ketoglutamicum*, *Arthrobacter roseoparaffinus* and *Micrococcus paraffinolyticus* under aerobic conditions in an aqueous nutrient medium containing at least one gaseous hydrocarbon as the main carbon source and at least one fermentation-enhancing additive selected from the group consisting of acetic acid, propionic acid, butyric acid, malonic acid, succinic acid and salts thereof, accumulating the L-glutamic acid in the resultant culture liquor, and recovering said L-glutamic acid therefrom.

2. The process of claim 1, wherein the hydrocarbon gas is selected from the group consisting of ethane, propane, and butane.

3. The process of claim 1, wherein the fermentation-enhancing additive is added to the fermentation medium in a concentration of about 0.01 to 5 percent by weight.

4. The process of claim 1, wherein the fermentation-enhancing additives are added to the fermentation medium at any time during the fermentation process.

5. The process of claim 1, wherein the hydrocarbon gas is n-butane.

6. The process of claim 1, wherein the culturing is conducted at a temperature of about 20° to 50° C. and a pH of about 4.0 to 9.0.

7. The process of claim 1, wherein at least one member selected from the group consisting of penicillin-G, n-decene and sesame oil is added to the fermentation medium in combination with the other fermentation additives.

8. A process for producing L-glutamic acid which comprises culturing a micro-organism selected from the group consisting of *Brevibacterium ketoglutamicum* ATCC 15,587, *Brevibacterium ketoglutamicum* ATCC 15,588, *Arthrobacter roseoparaffinus* ATCC 15,584 and *Micrococcus paraffinolyticus* ATCC 15,582 under aerobic conditions in an aqueous nutrient medium containing gaseous butane as the main carbon source and at least one fermentation-enhancing additive selected from the group consisting of acetic acid, propionic acid, butyric acid, malonic acid, succinic acid and salts thereof at a temperature of about 20° to 50° C. and a pH of about 4.0 to 9.0, accumulating the L-glutamic acid in the resultant culture liquor, and recovering said L-glutamic acid therefrom.

9. The process of claim 8, wherein said nutrient medium further includes at least one additive selected from the group consisting of penicillin-G, n-decene and sesame oil.

10. The process of claim 8, wherein the fermentation-enhancing additives are added to the fermentation medium in a concentration of about 0.01 to 5 percent by weight.

* * * * *